(12) United States Patent
Amdahl

(10) Patent No.: US 8,306,038 B1
(45) Date of Patent: Nov. 6, 2012

(54) METHODS FOR ENHANCING TCP COMMUNICATIONS AND SYSTEMS THEREOF

(75) Inventor: Saxon Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 276 days.

(21) Appl. No.: 12/648,892

(22) Filed: Dec. 29, 2009

(51) Int. Cl.
H04L 12/28 (2006.01)

(52) U.S. Cl. .................................. 370/395.52
(58) Field of Classification Search ............. 370/252, 370/389–394, 395.5–395.52, 469–477
See application file for complete search history.

(56) References Cited

U.S. PATENT DOCUMENTS

| | | | |
|---|---|---|---|
| 5,815,516 A * | 9/1998 | Aaker et al. ................. | 714/807 |
| 6,201,813 B1 | 3/2001 | Klausmeier et al. | |
| 6,246,684 B1 * | 6/2001 | Chapman et al. ............ | 370/394 |
| 6,415,329 B1 * | 7/2002 | Gelman et al. ............... | 709/245 |
| 6,453,357 B1 | 9/2002 | Crow et al. | |
| 6,944,672 B2 | 9/2005 | Crow et al. | |
| 7,171,486 B2 | 1/2007 | Narad et al. | |
| 7,236,501 B1 | 6/2007 | Lim et al. | |
| 2002/0161915 A1 | 10/2002 | Crow et al. | |
| 2005/0243834 A1 | 11/2005 | Fukuda | |
| 2006/0133379 A1 | 6/2006 | Krishnan et al. | |
| 2006/0200849 A1 | 9/2006 | Sundarrajan et al. | |
| 2007/0011329 A1 | 1/2007 | Albert et al. | |
| 2007/0171828 A1 | 7/2007 | Dalal et al. | |

OTHER PUBLICATIONS

Leung et al, An Overview of Packet Reordering in Transmission Control Protocol (TCP): Problems, Solutions, and Challenges, IEEE, 14 pages, 2007.*

* cited by examiner

Primary Examiner — Frank Duong
(74) Attorney, Agent, or Firm — LeClairRyan, a Professional Corporation

(57) ABSTRACT

A method, computer readable medium, and system for enhancing TCP communications includes transmitting a payload fragment for each of one or more of packets. A determination of which of the one or more packets to complete and reorder is made and a sequence in a completion fragment for one or more of the packets is adjusted based on the determination. One or more of the completion fragments are transmitted based on the determining to reassemble one or more of the transmitted payload fragments with one or more of the transmitted completion fragments based on the determination and adjustment.

32 Claims, 12 Drawing Sheets

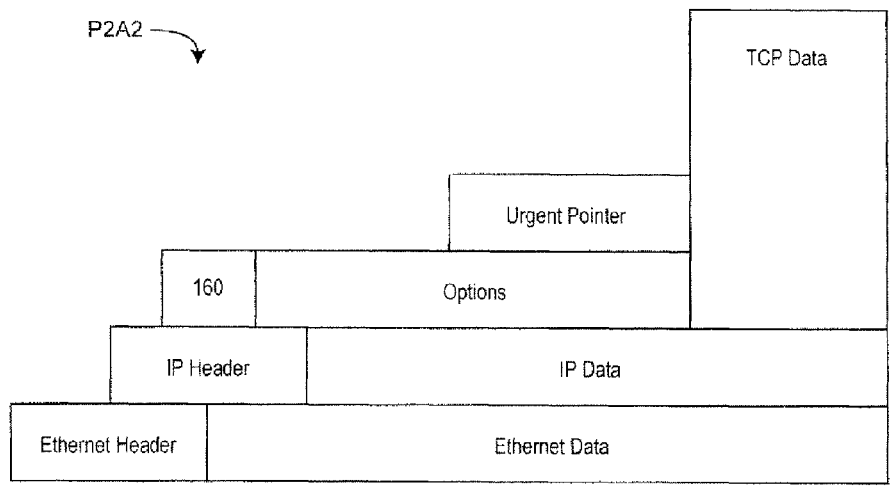

METHODS FOR ENHANCING TCP COMMUNICATIONS AND SYSTEMS THEREOF

FIELD OF THE INVENTION

This invention generally relates to network communications and, more particularly, to methods for enhancing transmission control protocol (TCP) communications and systems thereof.

BACKGROUND

One of the protocols used in communications between network entities to provide a reliable, in-order delivery of information is the Open System Interconnection Reference Model (OSI Reference Model or OSI Model). Basically, the OSI model comprises a plurality of layers with each of the layers having functions that provide services to the layer above and receive service from the layer below.

More specifically, the OSI Model includes seven layers known as the: Application Layer or Layer 7; Presentation Layer or Layer 6; Session Layer or Layer 5; Transport Layer or Layer 4; Network Layer or Layer 3; Data Link Layer or Layer 2; and Physical Layer or Layer 1. The typical basic functions of each of these layers are described below. The Application Layer interfaces directly to and performs services for applications operating on the network entity and also issues requests to the presentation layer. The Presentation Layer is used to establish a context between application layer entities. The Session Layer controls the dialogues/connections or sessions between network entities including establishing check pointing, adjournment, termination, and restart procedures. The Transport Layer controls the reliability of a given link through error control. The Network Layer performs reassembly of packets. The Data Link Layer provides the functional and procedural way to transfer data between network entities. The Physical Layer establishes and terminates the actual connection to a communications medium.

A simplified example of a typical TCP communication will now be described below. Since the operation of and interaction between these layers are well known to those of ordinary skill in the art, the description herein will focus on the Application Layer or Layer 7; Transport Layer or Layer 4; Network Layer or Layer 3; and Physical Layer or Layer 1. A source network entity generates or otherwise obtains one or more packets with data to be transmitted to at least one other destination network entity. Each of these packets includes a header which includes information, such as the source, destination, sequence, acknowledgement, and checksum, and a body which includes information, such as the data or payload. The Network Layer performs the necessary routing for these packets to be transmitted from the source network entity through one or more networks to the destination network entity. Each of the transmitted packets can take a different route to the destination network entity and thus the packets may arrive at the destination in the wrong order.

The destination network entity receives the transmitted packets at the Physical Layer which are passed up to the Transport Layer as the necessary functions are completed. The Transport Layer checks the sequence number in each of the transmitted packets to make sure none of the transmitted packets were lost during the transmission. Based on the check at the Transport Layer, the destination network entity will send an acknowledgement for the transmitted packets which have been successfully received to the source network entity. If an acknowledgment is not received by source network entity within a reasonable round trip time, then the transmitted packet(s) without an acknowledgement(s) is/are presumed lost and are retransmitted.

Additionally, at the Transport Layer the destination network entity checks to see if any of the received packets are corrupted by using a checksum. If one or more of the packets are corrupted, then the corrupted packets are discarded and the source network entity is notified and retransmits the packet(s) which previously were corrupted. As the received packets are determined to be in the proper sequence and uncorrupted, they are passed up as the necessary functions in each of the layers are performed to the Application Layer. Accordingly, TCP is specifically designed to provide reliable and in order delivery of data between network entities. However, TCP does not provide for any reordering or cancellation of any packets once transmitted.

SUMMARY

A method for enhancing TCP communications includes transmitting a payload fragment for each of one or more of packets. A determination of which of the one or more packets to complete and reorder is made and a sequence in a completion fragment for one or more of the packets is adjusted based on the determination. One or more of the completion fragments are transmitted based on the determining to reassemble one or more of the transmitted payload fragments with one or more of the transmitted completion fragments based on the determination and adjustment.

A computer readable medium having stored thereon instructions for enhancing TCP communications comprising machine executable code for execution by at least one processor includes transmitting a payload fragment for each of one or more of packets. A determination of which of the one or more packets to complete and reorder is made and a sequence in a completion fragment for one or more of the packets is adjusted based on the determination. One or more of the completion fragments are transmitted based on the determining to reassemble one or more of the transmitted payload fragments with one or more of the transmitted completion fragments based on the determination and adjustment.

A system for enhancing TCP communications includes an enhancement processing system and a communication system. The enhancement processing system determines which of one or more packets to complete and reorder and adjusts a sequence in a completion fragment for one or more of the packets based on the determination of which of the one or more packets to complete and reorder. The communication system transmits a payload fragment for each of one or more of packets and subsequently transmits one or more of the completion fragments for the one or more packets based on the determination of the enhancement processing system. The one or more of the transmitted payload fragments are reassembled with one or more of the transmitted completion fragments to complete one or more of the packets based on the determination and sequence adjustment.

The present invention provides a number of advantages including providing greater control and flexibility in data transmission by allowing packets to be transmitted and then to be canceled and/or re-ordered while still remaining in compliance with TCP. Additionally, the present invention provides flexibility in bandwidth and network congestion by allowing payload fragments to be transmitted at more opportune times to be later reassembled with completion fragments.

BRIEF DESCRIPTION OF THE DRAWINGS

FIG. 4A is a diagram of a portion of another exemplary payload fragment;

FIG. 4B is a diagram of another exemplary completion fragment for the corresponding first and second payload fragments shown in FIGS. 4A and 4C;

FIG. 4C is a diagram of a remaining portion of the payload fragment shown in FIG. 4A.

DETAILED DESCRIPTION

Figure 1:
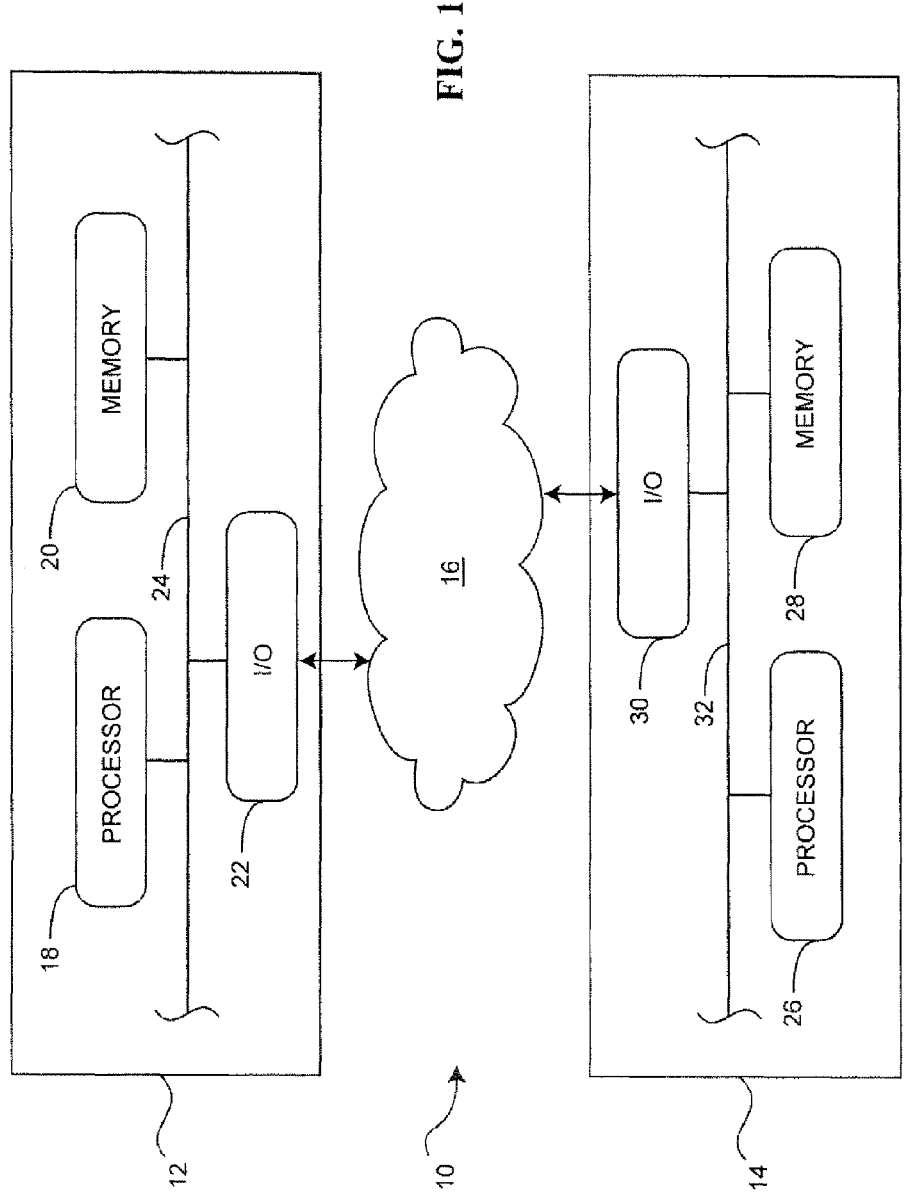
FIG. 1 is a block diagram of a system for enhancing TCP communications.

A system 10 for enhancing utilization of a TCP communications is illustrated in FIGS. 1-5. This system 10 includes computer systems 12 and 14 which are in communication with each other via a network 16, although the system 10 can comprise other numbers and types of entities, systems, devices, and components in other configurations. The present invention provides a number of advantages including providing greater control and flexibility in data transmission by allowing packets to be transmitted and then to be canceled and/or re-ordered while still remaining in compliance with TCP.

The computer system 12 includes a central processing unit (CPU) or processor 18, a memory 20, and an interface or I/O system 22 which are coupled together by a bus 24 or other link, although other numbers and types of network entities and other numbers and types of the components in the computer systems can be used. The processor 18 executes a program of stored instructions for one or more aspects of the present invention as described herein, including for enhancing TCP communications. The memory 20 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 18, can be used for the memory 20. The interface system 22 is used to operatively couple the computer system 12 for communications with the computer system 14 via the communications network 16, although other types and numbers of communication networks or systems with other types and numbers of connections and configurations can be used. By way of example only, the communication network 16 uses TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The computer system 14 includes a central processing unit (CPU) or processor 26, a memory 28, and an interface or I/O system 30 which are coupled together by a bus 32 or other link, although other numbers and types of network entities and other numbers and types of the components in the computer systems can be used. The processor 26 executes a program of stored instructions for one or more aspects of the present invention as described herein, including for enhancing TCP communications. The memory 28 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 26, can be used for the memory 28. The interface system 30 is used to operatively couple the computer system 14 for communications with the computer system 12 via the communications network 16, although other types and numbers of communication networks or systems with other types and numbers of connections and configurations can be used.

Although embodiments of the computer systems 12 and 14 are described and illustrated herein, each of the computer systems 12 and 14 can be implemented on any suitable computer system or other network entity. It is to be understood that the systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

The operation of the system in accordance with the present invention will now be described with reference to FIGS. 1-5. For ease of illustration and discussion in FIGS. 2A-2H, the Application Layer is labeled 7, the Presentation Layer is labeled 6, the Session Layer is labeled 5, the Transport Layer is labeled 4, the Network Layer is labeled 3, the Data Link Layer is labeled 2, and the Physical Layer is labeled 1, although other numbers and types of layers with other designations can be used.

Figures 3A, 3B:
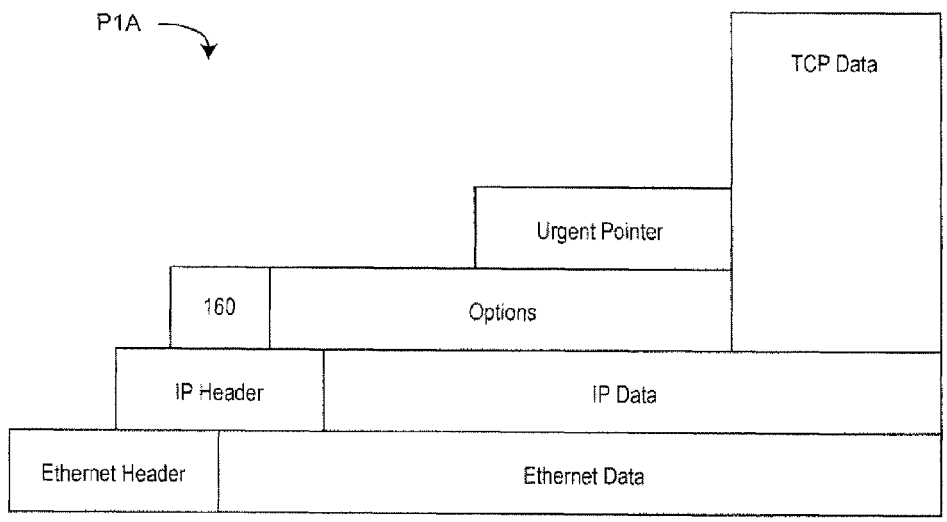
FIG. 3A is a diagram of an exemplary completion fragment.
FIG. 3B is a diagram of an exemplary payload fragment for the corresponding completion fragment shown in FIG. 3A.
Figure 5:
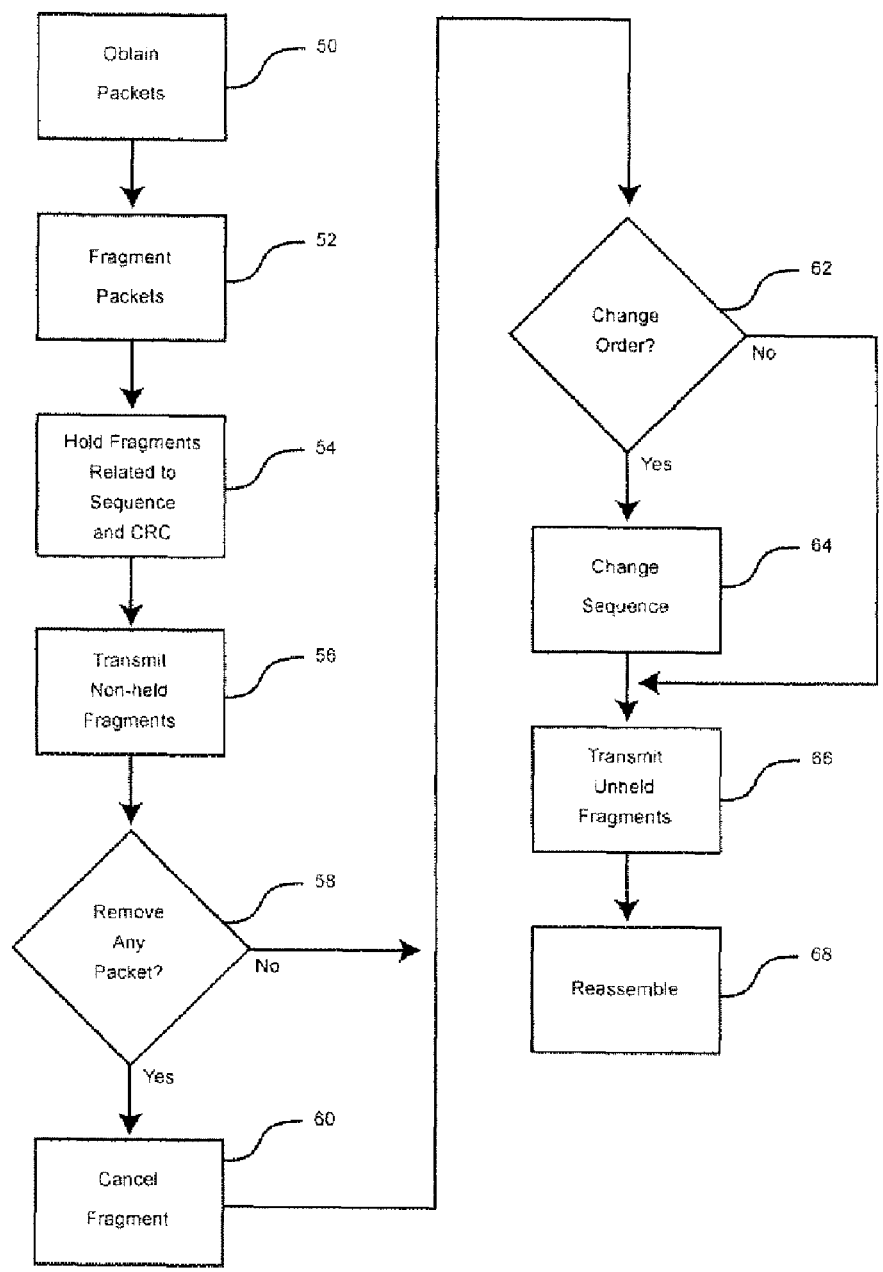
FIG. 5 is a flowchart of a method for enhancing TCP communications.

In step 50, the computer system 12 obtains packets P1, P2, and P3 to be transmitted to computer system 14, although other numbers and types of data could be obtained or generated in other manners for transmission. Each of the packets includes a header with data for a source, destination, sequence, acknowledgement, and checksum, and a body which the data or other payload, although the header and body in each packet can comprise other numbers and types of information. By way of example only, a packet P1 comprises the combination of the completion fragment P1B in FIG. 3A with the payload fragment illustrated in FIG. 3B and a packet P2 comprises the combination of the completion fragment P2B illustrated in FIG. 4B with the portion of the payload fragment P2A1 illustrated in FIG. 4A and the remaining portion of the payload fragment P2A2 illustrated in FIG. 4C. As illustrated by the examples in FIGS. 3A-3B and FIGS. 4A-4C, each packet can be divided in other manners, at other locations in the packets, and to form other numbers of portions of completion fragments and payload fragments. In this particular example, packets P1 and P3 have an identical format for being broken into a completion fragment and a payload fragment as illustrated in FIGS. 3A-3B, although as noted above each of the packets could have other formats. In a manner well know to those of ordinary skill in the art, the packets P1, P2, and P3 are passed to the Transport layer or Layer 4 in computer system 12.

Figure 2A:
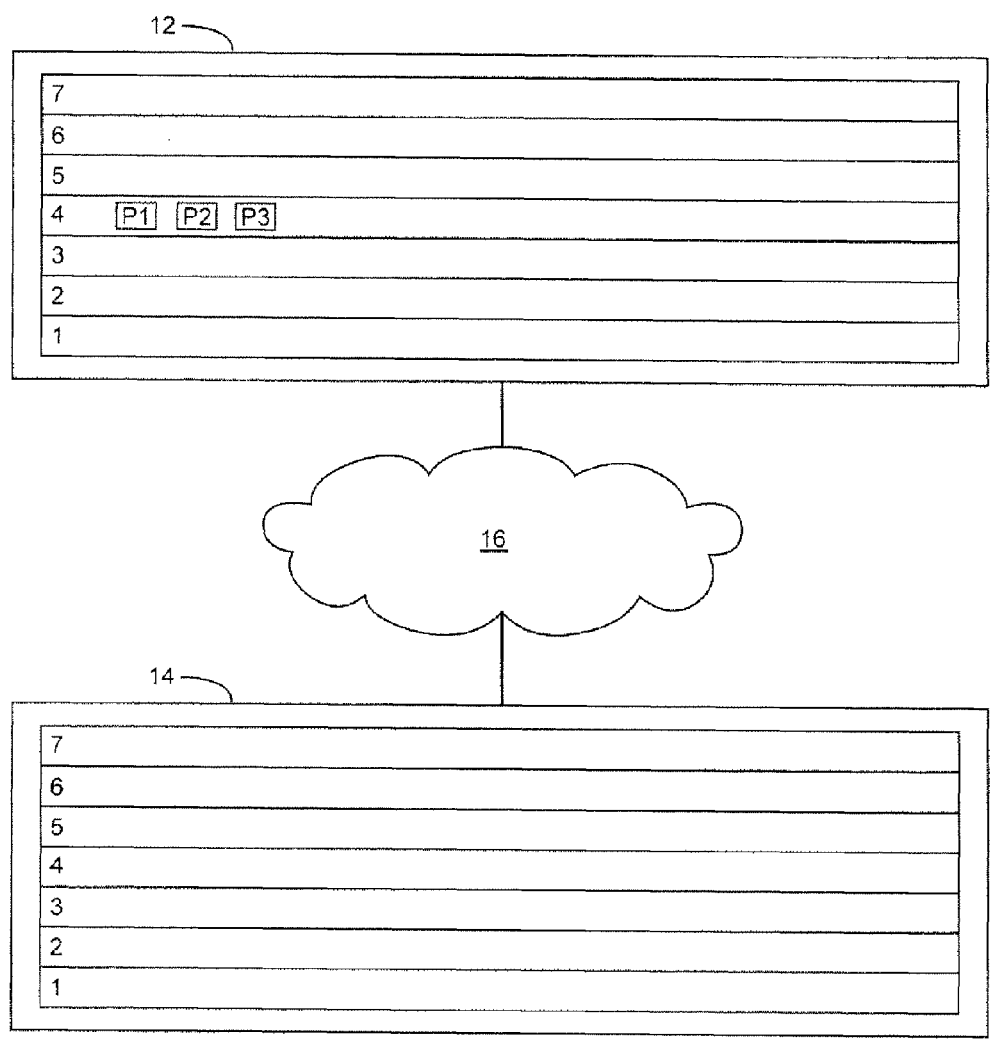
FIGS. 2A-2H are functional block diagrams of operations at various OSI Model layers.
Figure 2B:
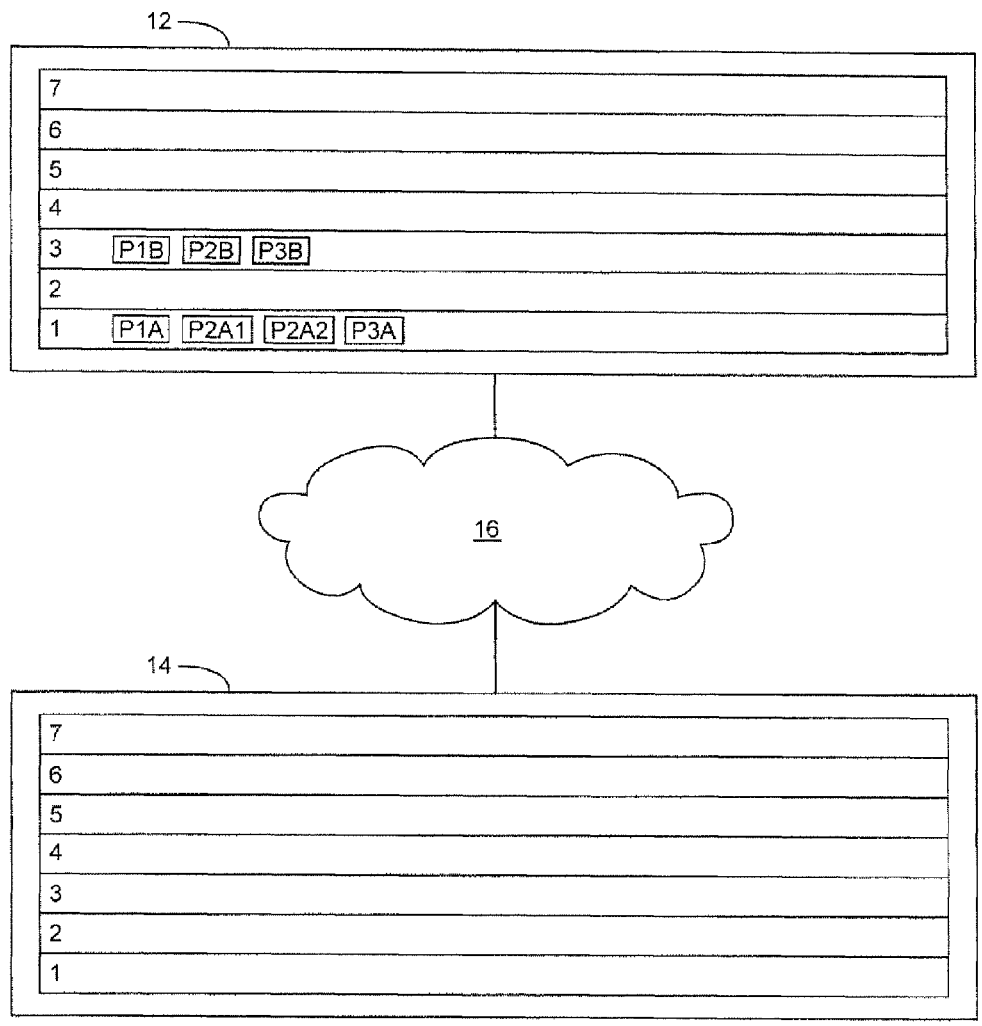

In step 52, in the Network Layer or Layer 3, the computer system 12 fragments each of the packets P1, P2, and P3 into the one or more portions of payload fragments P1A, P2A1, P2A2, and P3A and completion fragments P1B, P2B, P3B as illustrated in FIG. 2B, although one or more of the packets P1, P2, and P3 could be fragmented in other manners and numbers, such as one or more portions for each completion fragment. By way of example only, the payload fragment P1A for fragmented packet P1 is illustrated in FIG. 3B and the completion fragment P1B for fragmented packet P1 is illustrated in FIG. 3C and the payload fragments P2A1 and P2A2 for fragmented packet P2 are illustrated in FIGS. 4A and 4C and the completion fragment P2B for fragmented packet P2 is illustrated in FIG. 4B. Again in this example packet P3 is fragmented in the same manner and format as packet P1 shown in FIGS. 3A-3B, although again each of the packets could be fragmented in other manners and formats. The one or more portions of the payload fragments P1A, P2A1, P2A2, and P3A are passed to the Physical Layer or Layer 1 as shown in FIG. 2B for transmission to the computer system 14 in a manner well know to those of ordinary skill in the art.

Figure 2C:
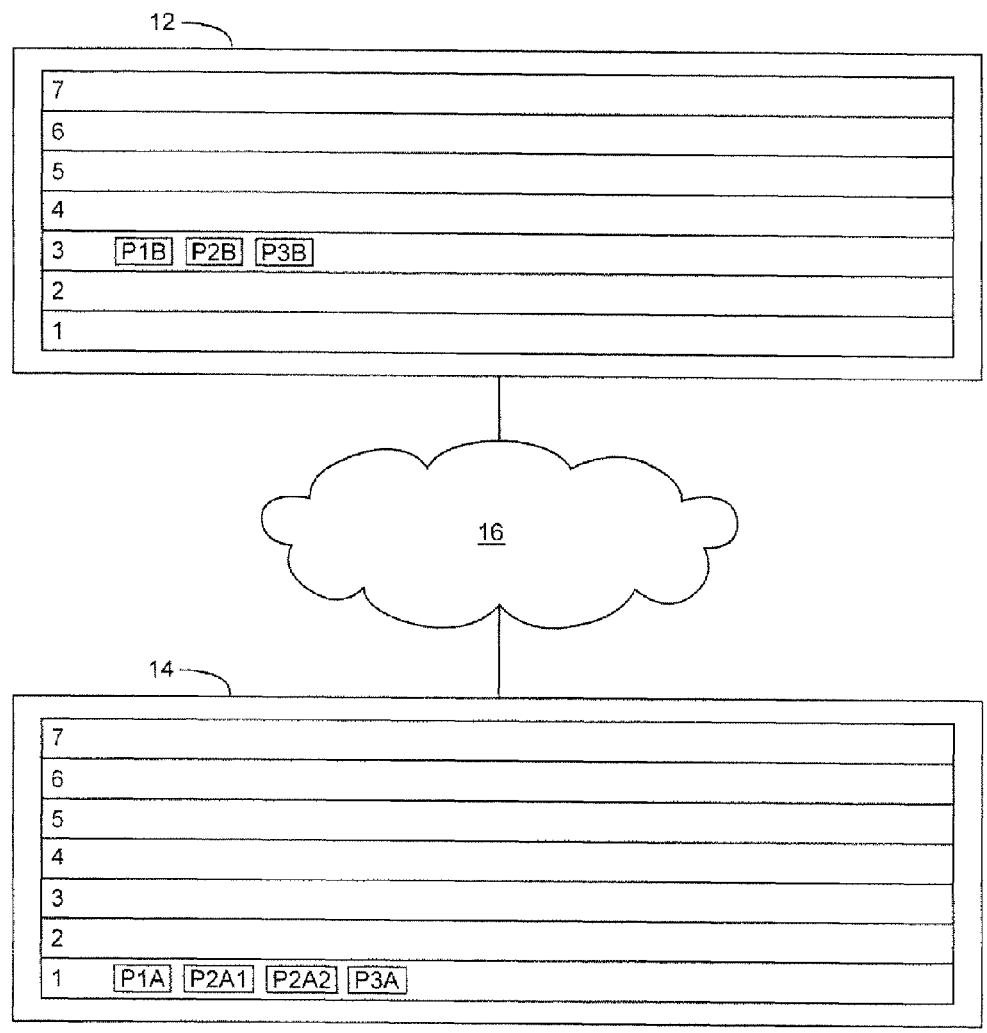

In step 56, the one or more portions of the payload fragments P1A, P2A1, P2A2, and P3A are transmitted from the Physical Layer in the computer system 12 to the Physical Layer in the computer system 14 as shown in FIG. 2C, although other numbers of packets could be transmitted. As discussed earlier, each of the one or more portions of the transmitted payload fragments P1A, P2A1, P2A2, and P3A can take a different route to the computer system 14 through one or more different networks. As a result, the one or more portions of the transmitted payload fragments P1A, P2A1, P2A2, and P3A may arrive at the Physical Layer in the computer system 14 in the wrong order and will require the sequence number in the completion fragments P1, P2B, and P3B to be properly sequenced. Accordingly, with the present invention the one or more portions of the payload fragments P1A, P2A1, P2A2, and P3A can be transmitted at more opportune times or in anticipation of particular requests for reassembly at a later time to complete the payload fragments and to reassemble with the corresponding completion fragments.

In step 58, the computer system 12 determines if one or more of the packets P1, P2, and P3 should be cancelled. Accordingly, the present invention enhances TCP communications by enabling one or more of the payload fragments P1A, P2A1, P2A2, and P3A to be cancelled after transmission of the payload fragments P1A, P2A1, P2A2, and P3A to the computer system 14. If the computer system 12 determines none of the packets P1, P2, and P3 should be cancelled, then the No branch is taken to step 62. If the computer system 12 determines one or more of the packets P1, P2, and P3 should be cancelled, then the Yes branch is taken to step 60. In this example, computer system 12 determines packet P2 should be cancelled, although other numbers of packets could be cancelled or none of the packets could be cancelled.

Figure 2D:
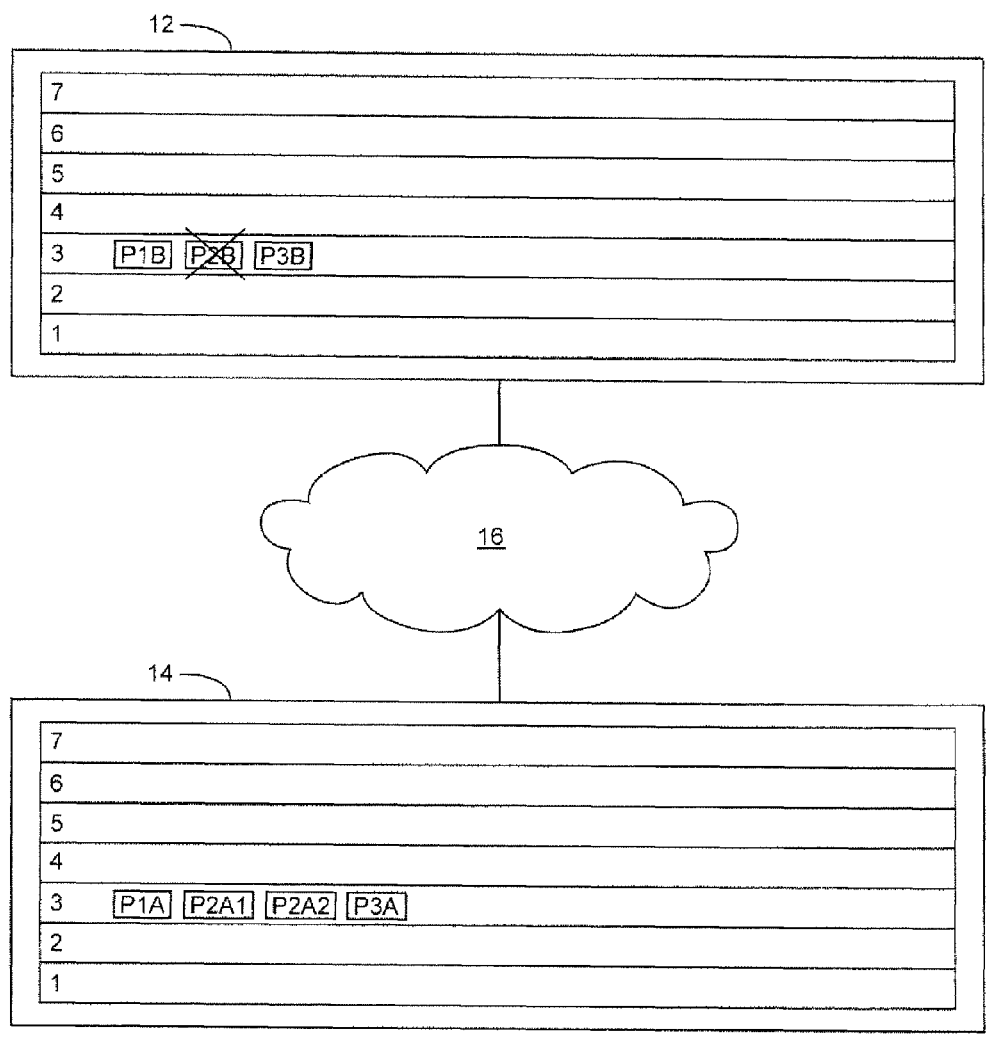

In step 60, the Transport Layer in computer system 12 cancels the completion fragment P2B by either a drop action (failure to transmit) or a corruption of the CRC as shown in FIG. 2D, although other manners for canceling the packet can be used. Additionally, the transmitted payload fragments P1A, P2A1, P2A2, and P3A are passed to the Network Layer in computer system 14 waiting for the completion fragments P1B, P2B, and P3B for reassembly into packets P1, P2, and P3.

In step 62, the Transport Layer in computer system 12 determines if the sequence of one or more of the completion fragments P1B, P2B, and P3B needs to be adjusted. If the sequence of one or more of the completion fragments P1B, P2B, and P3B does not need to be adjusted, then the No branch is taken to step 66. If the sequence of one or more of the completion fragments P1B, P2B, and P3B does need to be adjusted, then the Yes branch is taken to step 64.

Figure 2E:
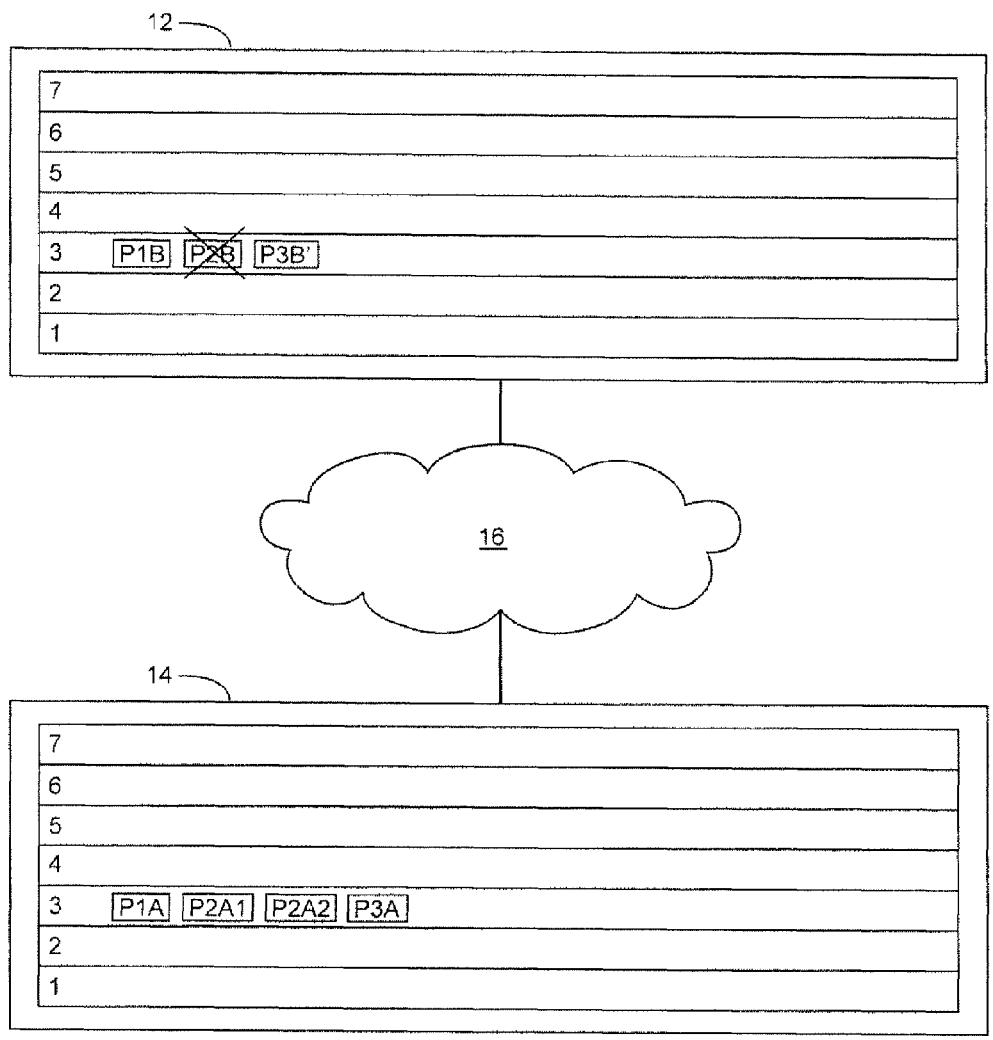

In step 64, the Transport Layer in computer system 12 adjusts the sequence of one or more of the completion fragments P1B, P2B, and P3B. In this example, since completion fragment P2B has been cancelled, the sequence in completion fragment P3B is adjusted to become completion fragment P3B' so packet P3 directly follows packet P1 as shown in FIG. 2E, although the sequence of the packets can be adjusted for other reasons and in other manners. For example, if none of the packets were cancelled in step 60, the packets could still be reordered in step 64. The sequence numbers are tracked by the computer systems 12 and 14 so if one or more packets are cancelled, then all of the packets following the reorder will have the correct sequence number.

Figure 2F:
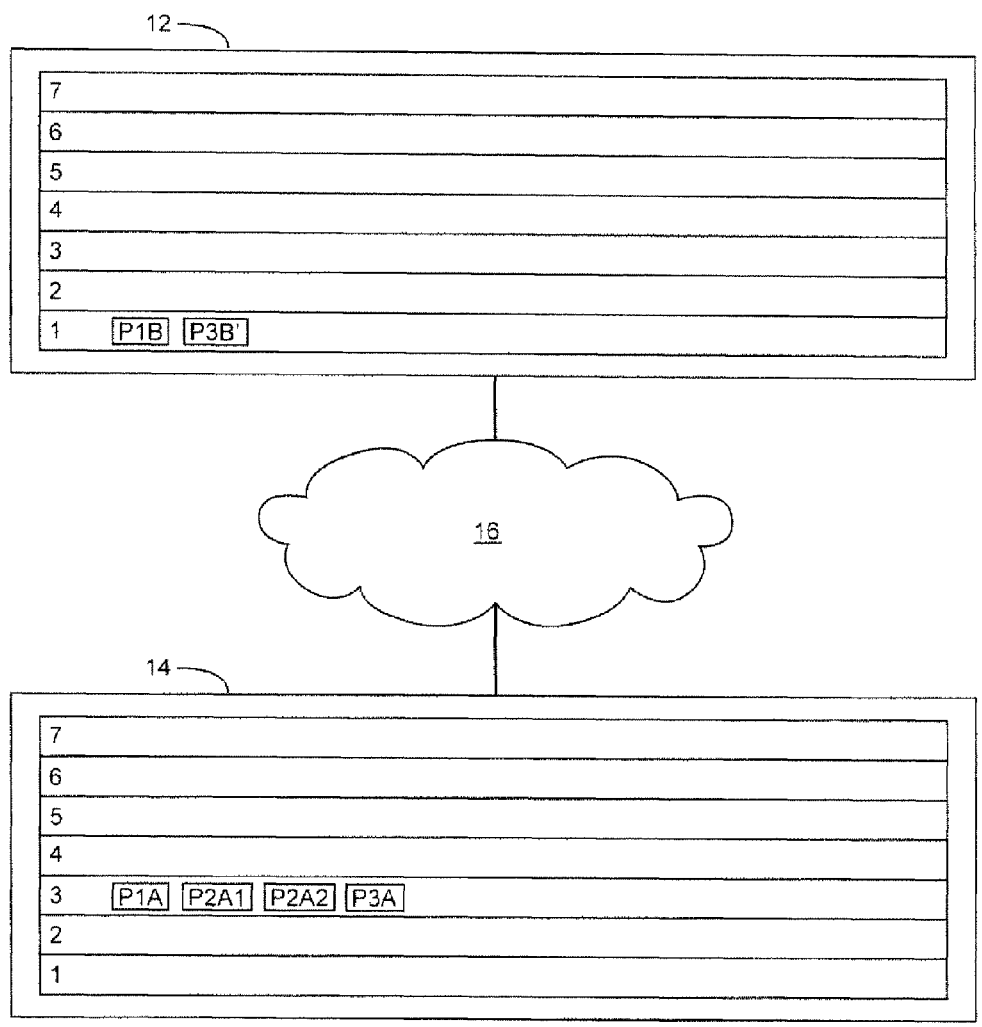

In step 66, when the computer system 12 determines it is time to complete the packets, the completion packets are sent from computer system 12 to the computer system 14. In this example, the completion fragments P1B and P3B' are passed to the Physical Layer in computer system 12 as shown in FIG. 2F and are transmitted to the Physical Layer in computer system 14 in a manner well known to those of ordinary skill in the art.

Figure 2G:
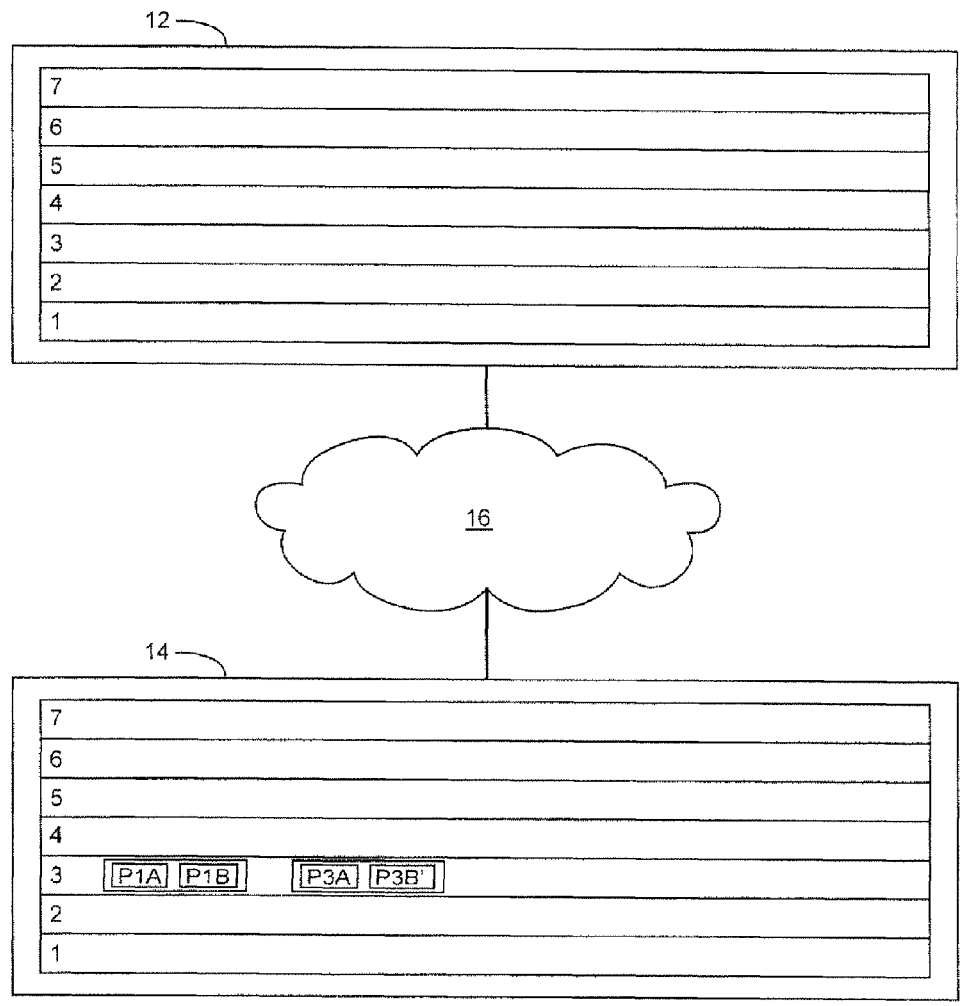
Figure 2H:
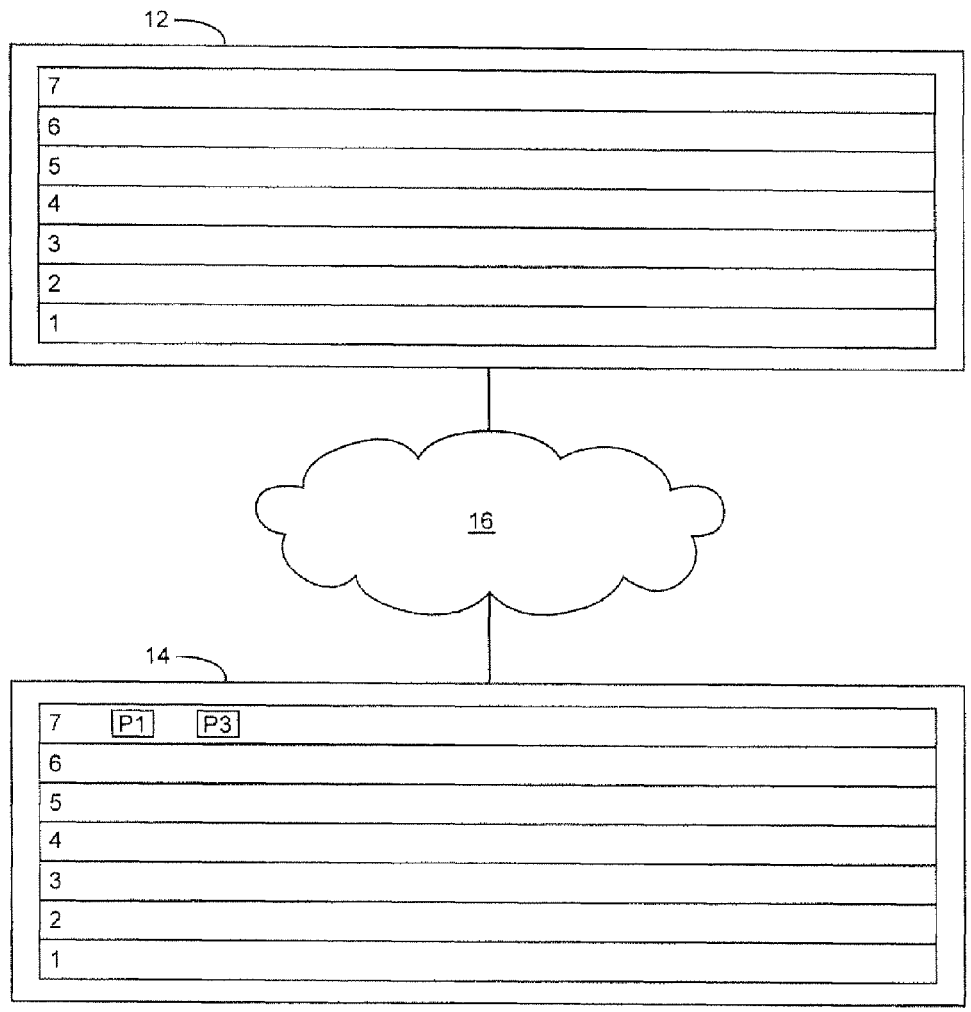

In step 68, the computer system 14 receives the completion fragments and reassembles the received completion fragments with the corresponding payload fragments. In this example, completion fragments P1B and P3B' are reassembled with payload fragments P1A and P3A, respectively, to reassemble packets P1 and P3 as shown in FIG. 2G. Additionally, the payload fragment P2B which is not completed is not reassembled and thus is removed by the computer system 14. Since the packets P1 and P3 are in the proper sequence, the computer system 14 does not transmit a request for the completion fragment P2B. The reassembled packets P1 and P3 are passed up to the Application Layer in computer system 14 for use in one or more applications as shown in FIG. 2H in a manner well known to those of ordinary skill in the art.

Accordingly, as described herein the present invention allows greater control and flexibility in data transmission by allowing data to be transmitted and then to be canceled or re-ordered while still remaining in compliance with TCP. Additionally, the present invention assists with bandwidth and network congestion by allowing payload fragments to be transmitted at more opportune times to be later reassembled with completion fragments.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for enhancing TCP communications, the method comprising:
   transmitting, by a computing device, a payload fragment for each of one or more of packets;
   determining, by the computing device, which of the one or more packets to complete and reorder;
   adjusting, by the computing device, a sequence in a completion fragment for one or more of the packets based on the determining which of the one or more packets to complete and reorder; and
   transmitting, by the computing device, one or more of the completion fragments for the one or more packets based on the determining to reassemble one or more of the transmitted payload fragments with one or more of the transmitted completion fragments to complete one or more of the packets based on the determining and the adjusting.

2. The method as set forth in claim 1 further comprising:
   obtaining, by the computing device, the one or more packets; and
   fragmenting, by the computing device, the one or more packets into one or more portions of the payload fragment and one or more portions of the completion fragment.

3. The method as set forth in claim 1 wherein each of the completion fragments comprises one or more transport layer headers.

4. The method as set forth in claim 3 wherein at least one of the completion fragments comprises all of the transport layer headers up to and including a checksum and at least one of the payload fragments corresponding to the at least one of the completion fragments comprises all data after the checksum.

5. The method as set forth in claim 3 wherein at least one of the completion fragments comprises the transport layer headers including and between a sequence number and a checksum and at least one of the payload fragments corresponding to the at least one of the completion fragments comprises a portion with the transport layer headers for a source port and destination port and a remaining portion with all data after the checksum.

6. The method as set forth in claim 3 wherein the one or more headers comprise a sequence value and an error identification value.

7. The method as set forth in claim 6 wherein the adjusting a sequence further comprises adjusting the sequence value.

8. The method as set forth in claim 1 further comprising establishing, by the computing device, a connection for the transmitting the payload fragment and the transmitting the one or more completion fragments.

9. A non-transitory computer readable medium having stored thereon instructions for enhancing TCP communications comprising machine executable code which when executed by at least one processor, causes the processor to perform steps comprising:
   transmitting a payload fragment for each of one or more of packets;
   determining which of the one or more packets to complete and reorder;
   adjusting a sequence in a completion fragment for one or more of the packets based on the determining which of the one or more packets to complete and reorder; and
   transmitting one or more of the completion fragments for the one or more packets based on the determining to reassemble one or more of the transmitted payload fragments with one or more of the transmitted completion fragments to complete one or more of the packets based on the determining and the adjusting.

10. The non-transitory computer readable medium as set forth in claim 9 further comprising:
    obtaining the one or more packets; and
    fragmenting the one or more packets into one or more portions of the payload fragment and one or more portions of the completion fragment.

11. The non-transitory computer readable medium as set forth in claim 9 wherein each of the completion fragments comprises one or more headers.

12. The non-transitory computer readable medium as set forth in claim 11 wherein at least one of the completion fragments comprises all of the transport layer headers up to and including a checksum and at least one of the payload fragments corresponding to the at least one of the completion fragments comprises all data after the checksum.

13. The non-transitory computer readable medium as set forth in claim 11 wherein at least one of the completion fragments comprises the transport layer headers including and between a sequence number and a checksum and at least one of the payload fragments corresponding to the at least one of the completion fragments comprises a portion with the transport layer headers for a source port and destination port and a remaining portion with all data after the checksum.

14. The non-transitory computer readable medium as set forth in claim 11 wherein the one or more headers comprise a sequence value and an error identification value.

15. The non-transitory computer readable medium as set forth in claim 14 wherein the adjusting a sequence further comprises adjusting the sequence value.

16. The non-transitory computer readable medium as set forth in claim 9 further comprising establishing a connection for the transmitting the payload fragment and the transmitting the one or more completion fragments.

17. A system for enhancing TCP communications, the system comprising:
    an enhancement processing system that determines which of one or more packets to complete and reorder and adjusts a sequence in a completion fragment for one or more of the packets based on the determination of which of the one or more packets to complete and reorder; and a communication system that transmits a payload fragment for each of one or more of packets and subsequently transmits one or more of the completion fragments for the one or more packets based on the determination of the enhancement processing system to reassemble one or more of the transmitted payload fragments with one or more of the transmitted completion fragments to complete one or more of the packets based on the determination and sequence adjustment.

18. The system as set forth in claim 17 wherein the enhancement processing system obtains the one or more packets and fragments the one or more packets into one or more portions of the payload fragment and one or more portions of the completion fragment.

19. The system as set forth in claim 17 wherein each of the completion fragments comprises one or more headers.

20. The system as set forth in claim 19 wherein at least one of the completion fragments comprises all of the transport layer headers up to and including a checksum and at least one of the payload fragments corresponding to the at least one of the completion fragments comprises all data after the checksum.

21. The system as set forth in claim 19 wherein at least one of the completion fragments comprises the transport layer headers including and between a sequence number and a checksum and at least one of the payload fragments corresponding to the at least one of the completion fragments comprises a portion with the transport layer headers for a source port and destination port and a remaining portion with all data after the checksum.

22. The system as set forth in claim 19 wherein the one or more headers comprise a sequence value and an error identification value.

23. The system as set forth in claim 22 wherein the enhancement processing system adjusts the sequence value to adjust the order of the packets.

24. The system as set forth in claim 17 wherein the communication system establishes a connection for the transmitting the payload fragment and the transmitting the one or more completion fragments.

25. A computing apparatus for enhancing TCP communications, the apparatus comprising:
   a processor coupled to a memory and configured to execute programmed instructions stored in the memory comprising:
      transmitting a payload fragment for each of one or more of packets;
      determining which of the one or more packets to complete and reorder;
      adjusting a sequence in a completion fragment for one or more of the packets based on the determining which of the one or more packets to complete and reorder; and
      transmitting one or more of the completion fragments for the one or more packets based on the determining to reassemble one or more of the transmitted payload fragments with one or more of the transmitted completion fragments to complete one or more of the packets based on the determining and the adjusting.

26. The apparatus as set forth in claim 25 wherein the processor is further configured to execute programmed instructions stored in the memory further comprising:
   obtaining the one or more packets; and
   fragmenting the one or more packets into one or more portions of the payload fragment and one or more portions of the completion fragment.

27. The apparatus as set forth in claim 25 wherein the processor is further configured to execute programmed instructions stored in the memory for the transmitting the one or more of the completion fragments further comprises transmitting the one or more completion fragments comprising one or more headers.

28. The apparatus as set forth in claim 27 wherein the processor is further configured to execute programmed instructions stored in the memory for the transmitting the one or more of the completion fragments further comprises transmitting at least one of the completion fragments further comprising all of the transport layer headers up to and including a checksum and at least one of the payload fragments corresponding to the at least one of the completion fragments further comprising all data after the checksum.

29. The apparatus as set forth in claim 27 wherein the processor is further configured to execute programmed instructions stored in the memory for the transmitting the one or more of the completion fragments further comprises transmitting at least one of the completion fragments further comprising the transport layer headers including and between a sequence number and a checksum and at least one of the payload fragments corresponding to the at least one of the completion fragments further comprising a portion with the transport layer headers for a source port and destination port and a remaining portion with all data after the checksum.

30. The apparatus as set forth in claim 27 wherein the processor is further configured to execute programmed instructions stored in the memory for the transmitting the one or more of the completion fragments comprising one or more headers further comprises transmitting the one or more of the completion fragments comprising a sequence value and an error identification value.

31. The apparatus as set forth in claim 30 wherein the processor is further configured to execute programmed instructions stored in the memory for the adjusting a sequence further comprising adjusting the sequence value.

32. The apparatus as set forth in claim 25 wherein the processor is further configured to execute programmed instructions stored in the memory further comprising establishing a connection for the transmitting the payload fragment and the transmitting the one or more completion fragments.

* * * * *